US 9,702,341 B2

(12) United States Patent
Pandya (10) Patent No.: US 9,702,341 B2
(45) Date of Patent: Jul. 11, 2017

(54) PITCH BEARING WITH A GEAR SEGMENT IN A WIND TURBINE

(71) Applicant: Gamesa Innovation & Technology, S.L., Sarriguren (Navarra) (ES)

(72) Inventor: Bhavbhuti Pandya, Sarriguren (ES)

(73) Assignee: ADWEN OFFSHORE S. L., Zamudio (Bizkaia) (ES)

( * ) Notice: Subject to any disclaimer, the term of this patent is extended or adjusted under 35 U.S.C. 154(b) by 391 days.

(21) Appl. No.: 13/898,767

(22) Filed: May 21, 2013

(65) Prior Publication Data
US 2013/0309069 A1    Nov. 21, 2013

(30) Foreign Application Priority Data

May 21, 2012 (ES) .................................. 201200529

(51) Int. Cl.
| F03D 7/02 | (2006.01) |
| F03D 80/70 | (2016.01) |
| F03D 1/06 | (2006.01) |

(52) U.S. Cl.
CPC .......... *F03D 7/0224* (2013.01); *F03D 1/0658* (2013.01); *F03D 80/70* (2016.05); *F05B 2230/60* (2013.01); *F05B 2230/80* (2013.01); *F05B 2250/36* (2013.01); *F05B 2260/503* (2013.01); *F05B 2260/79* (2013.01); *Y02E 10/721* (2013.01); *Y02P 70/523* (2015.11); *Y10T 29/49464* (2015.01)

(58) Field of Classification Search
CPC ................................ F03D 7/0224; F03D 80/70
See application file for complete search history.

(56) References Cited

U.S. PATENT DOCUMENTS

| 7,331,761 | B2 * | 2/2008 | Hansen | ................ | F03D 7/0224 |
| | | | | | 415/2.1 |
| 8,628,301 | B2 * | 1/2014 | Pasquet | ................ | F03D 1/0658 |
| | | | | | 416/148 |
| 2007/0277644 | A1 * | 12/2007 | King | ................ | F16D 1/076 |
| | | | | | 74/572.2 |
| 2009/0220343 | A1 * | 9/2009 | Dimascio | ................ | F03D 1/003 |
| | | | | | 416/161 |
| 2012/0148411 | A1 * | 6/2012 | Andersen | ............ | F03D 7/0224 |
| | | | | | 416/153 |

* cited by examiner

*Primary Examiner* — Richard Edgar
(74) *Attorney, Agent, or Firm* — Ladas & Parry LLP (57) ABSTRACT

A segmented gear plate configured to be removably connected to a pitch bearing of a wind turbine has been described. The pitch bearing is present between a rotor hub and a plurality of blades. The pitch bearing axially pivots the plurality of blades between different pitch angles. The pitch bearing includes an inner bearing ring and an outer bearing ring rotatably interconnected to each other. The segmented gear plate is removably connected to at least one of the inner bearing ring or the outer bearing ring by at least one connecting element. The segmented gear plate having a plurality of gear teeth, the plurality of gear teeth configured to allow the rotation of a drive shaft of a motor to achieve different pitch angles.

9 Claims, 9 Drawing Sheets

PITCH BEARING WITH A GEAR SEGMENT IN A WIND TURBINE

FIELD OF THE INVENTION

The present invention generally relates to wind turbines, and more particularly to, a gear segment and method of attaching the gear segment with a pitch bearing of the wind turbine.

BACKGROUND OF THE DISCLOSURE

Normally a wind turbine comprises a plurality of blades connected to a nacelle through a rotor hub. The wind turbine further includes a control mechanism to control the pitch of the blades. The wind turbines adjust rotor blade pitch for several reasons. The blades are pitched to improve the wind turbine efficiency by adapting the blade aerodynamics with wind speed changes. Another reason is to take the blades to an unloaded or feathered condition, in the event that wind speed exceeds the maximum safe rated speed or in the event of fault conditions. Wind turbines typically include a mechanism for axially pivoting the plurality of blades relative to the rotor hub to shift the blade between different pitch angles. To perform the pitch, each blade is provided with a pitch bearing between the hub and the blade, and some sort of mechanism, most often a hydraulic cylinder, to provide the force for pitching the blade and maintaining it in a given position. This pitching arrangement enables each blade to be turned approximately 120° around their rotational axis.

In the existing arrangement, the inner/outer bearing rings are manufactured in such a way that only a portion of the ring includes gears. This kind of arrangement is sufficient to rotate the blade for the required pitch angle. Though, for this type of bearing rings, it is very hard to manufacture the pattern of gears on the inner/outer ring. The other problem is that even after manufacturing the gears, when the gear teeth are hardened, there are chances of distortion at the end of the geared portion. So, homogeneous hardening cannot be done. Also, it is always difficult to remove the complete bearing ring for maintenance or repair purpose.

While various other methods have been developed in the past for providing an arrangement to maintain the pitching arrangement in the wind turbines, there is still room for development. Thus a need persists for further contributions in this area of technology.

SUMMARY OF THE DISCLOSURE

The above-mentioned shortcomings, disadvantages and problems are addressed herein which will be understood by reading and understanding the following specification.

The present invention is directed to a segmented gear plate configured to be removably connected to a pitch bearing of a wind turbine. The wind turbine including a plurality of blades mounted on a rotor hub. The rotor hub is mounted on a nacelle through the pitch bearing. The pitch bearing axially pivots the plurality of blades between different pitch angles. The pitch bearing includes an inner bearing ring and an outer bearing ring rotatably interconnected to each other. The segmented gear plate is removably connected to at least one of the inner bearing ring or the outer bearing ring by at least one connecting element. The gear segment having a plurality of gear teeth, the plurality of gear teeth configured to allow the rotation of a drive shaft of a motor to achieve different pitch angles. The gear segment is manufactured and heat treated separately to avoid any distortion on the inner bearing ring or the outer bearing ring of the pitch bearing.

Others will become apparent to those skilled in the art upon consideration of the following detailed description of illustrative embodiments exemplifying the best mode of carrying out the invention as presently perceived.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

While the present disclosure can take many different forms, for the purpose of promoting an understanding of the principles of the disclosure, reference will now be made to the embodiments illustrated in the drawings, and specific language will be used to describe the same. No limitation of the scope of the disclosure is thereby intended. Various alterations, further modifications of the described embodiments, and any further applications of the principles of the disclosure, as described herein, are contemplated.

The present invention is directed to a segmented gear plate configured to be removably connected to a pitch bearing of a wind turbine. The wind turbine including a plurality of blades mounted on a rotor hub, the rotor hub mounted on a nacelle through the pitch bearing. The pitch bearing axially pivots the plurality of blades between different pitch angles. The pitch bearing includes an inner bearing ring and an outer bearing ring rotatably interconnected to each other. The segmented gear plate is removably connected to at least one of the inner bearing ring or the outer bearing ring by at least one connecting element. The gear segment having a plurality of gear teeth, the plurality of gear teeth configured to allow the rotation of a drive shaft to achieve different pitch angles.

Figure 1:
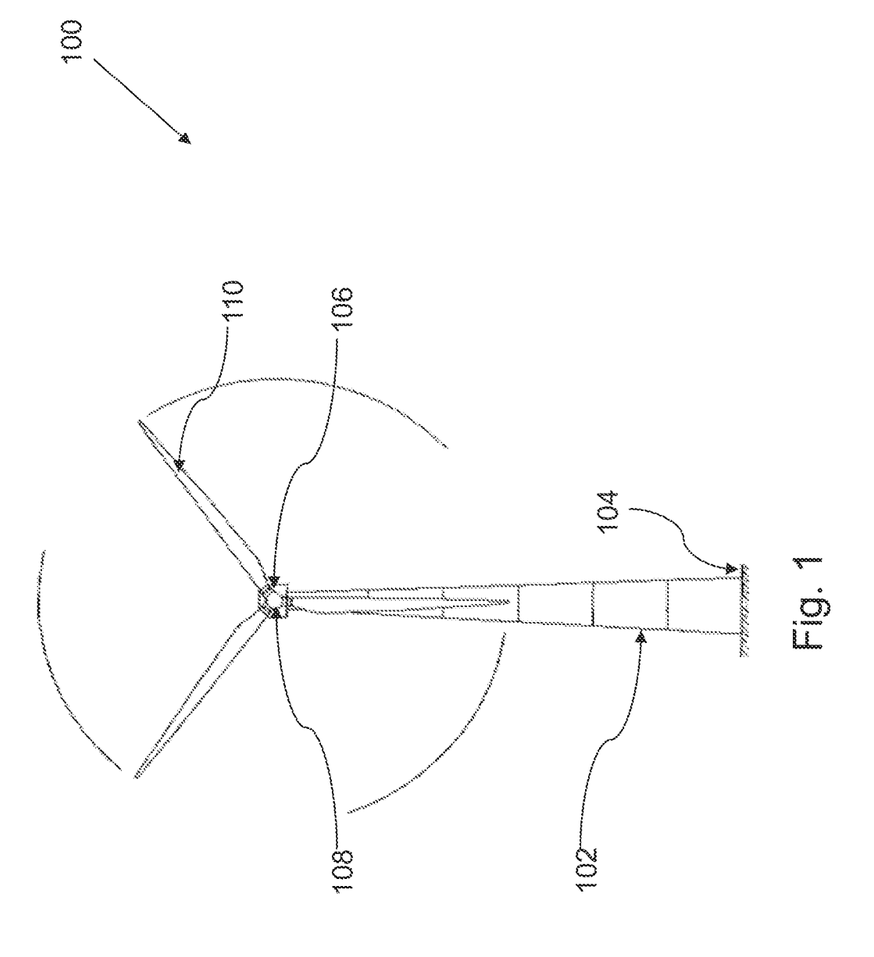
FIG. 1 is a perspective view of a wind turbine according to an embodiment of the disclosure.

FIG. 1 is a front view showing a wind turbine 100 according to an illustrative embodiment of the disclosure. It should be appreciated that the wind turbine 100 can be an offshore wind turbine or an onshore wind turbine. The illustrated wind turbine 100 includes a wind turbine tower (hereinafter referred to as "tower") 102 vertically erected on a foundation 104 or a wind turbine base 104 on land or off-shore, a nacelle 106 mounted at the upper end of the tower 102, and a rotor hub 108 mounted at the front end of the nacelle 106 so as to be supported rotatably about the substantially horizontal lateral rotation axis, perpendicular to the plane of paper thereof. The rotor hub 108 has a plurality of wind turbine blades 110 (for example, three as shown in FIG. 1) mounted in a radial pattern about its rotation axis. Thus, the power of wind blowing against the wind turbine blades 110 from the direction of the rotation axis of the rotor head 108 is converted to motive power that rotates the rotor hub 108 about the rotation axis. An anemometer (not shown in the figure) that measures the wind speed value in the vicinity and an anemoscope (not shown) that measures the wind direction are disposed at appropriate locations of the outer peripheral surface (for example, at the top, etc.) of the nacelle 106.

Figure 2:
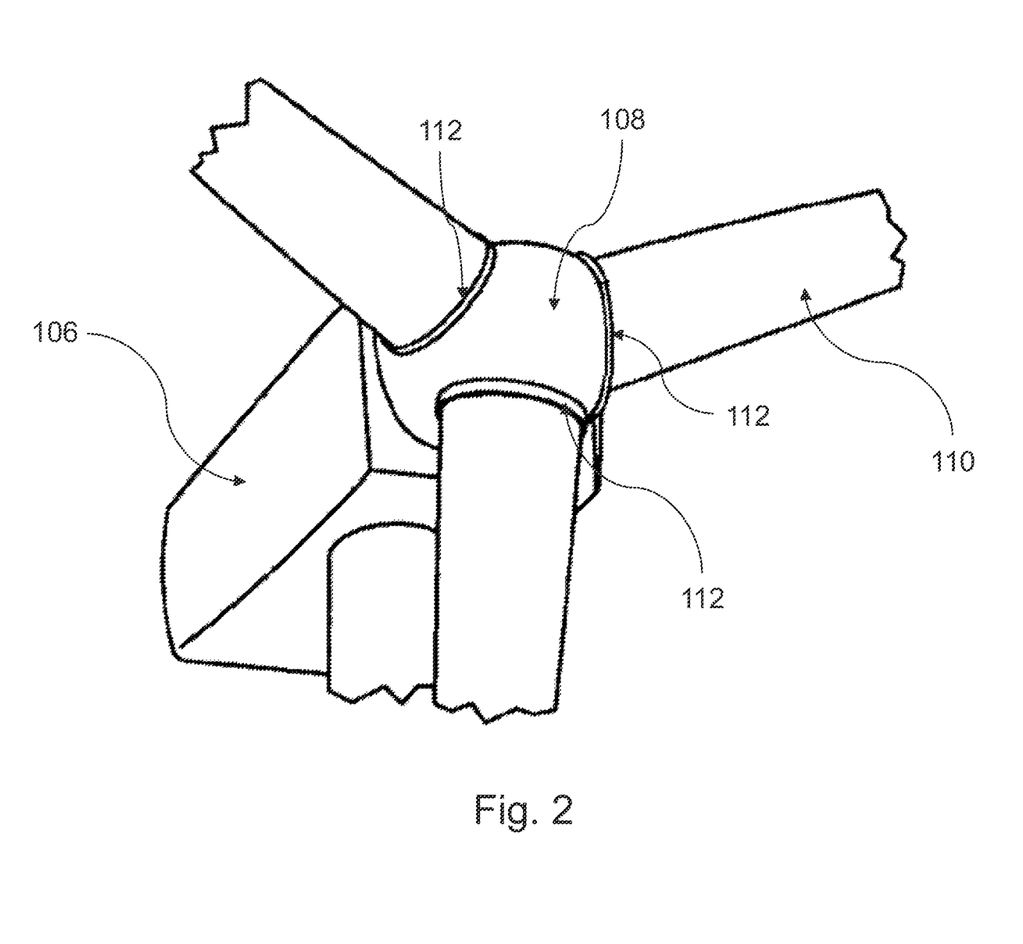
FIG. 2 is a perspective view of the a nacelle, a rotor hub along with a portion of blades of the wind turbine described in the embodiment of FIG. 1.

The wind turbine 100 further includes a pitch bearing 112 present between the rotor hub 108 and the plurality of blades 110 as shown in FIG. 2. Each of the plurality of blades 110 is connected to the rotor hub 108 through the pitch bearing 112. The pitch bearing 112 is configured to axially pivot the plurality of blades 110 between different pitch angles. The pitch angle needs to be changed to achieve the maximum efficiency of the wind turbine 100 depending on various features such as wind speed, wind direction etc.

The pitch bearing 112 includes an annularly shaped inner bearing ring 114, an annularly-shaped outer bearing ring 116 and a plurality of rolling elements (not shown in the figures) present between the outer bearing ring 116 and the inner bearing ring 114 to provide the smooth rotation between the inner and outer bearing rings 114 and 116. The outer bearing ring 116 and the inner bearing ring 114 are rotatably interconnected to each other. The plurality of rolling elements comprises a plurality of balls made of steel and/or other suitable materials, which may be selectively hardened to provide long operating life and smooth rotation between inner and outer bearing rings 114 and 116. The pitch bearing 112 can also include any other kind of mechanism to reduce the friction between the inner bearing ring 114 and the outer bearing ring 116.

Figure 3:
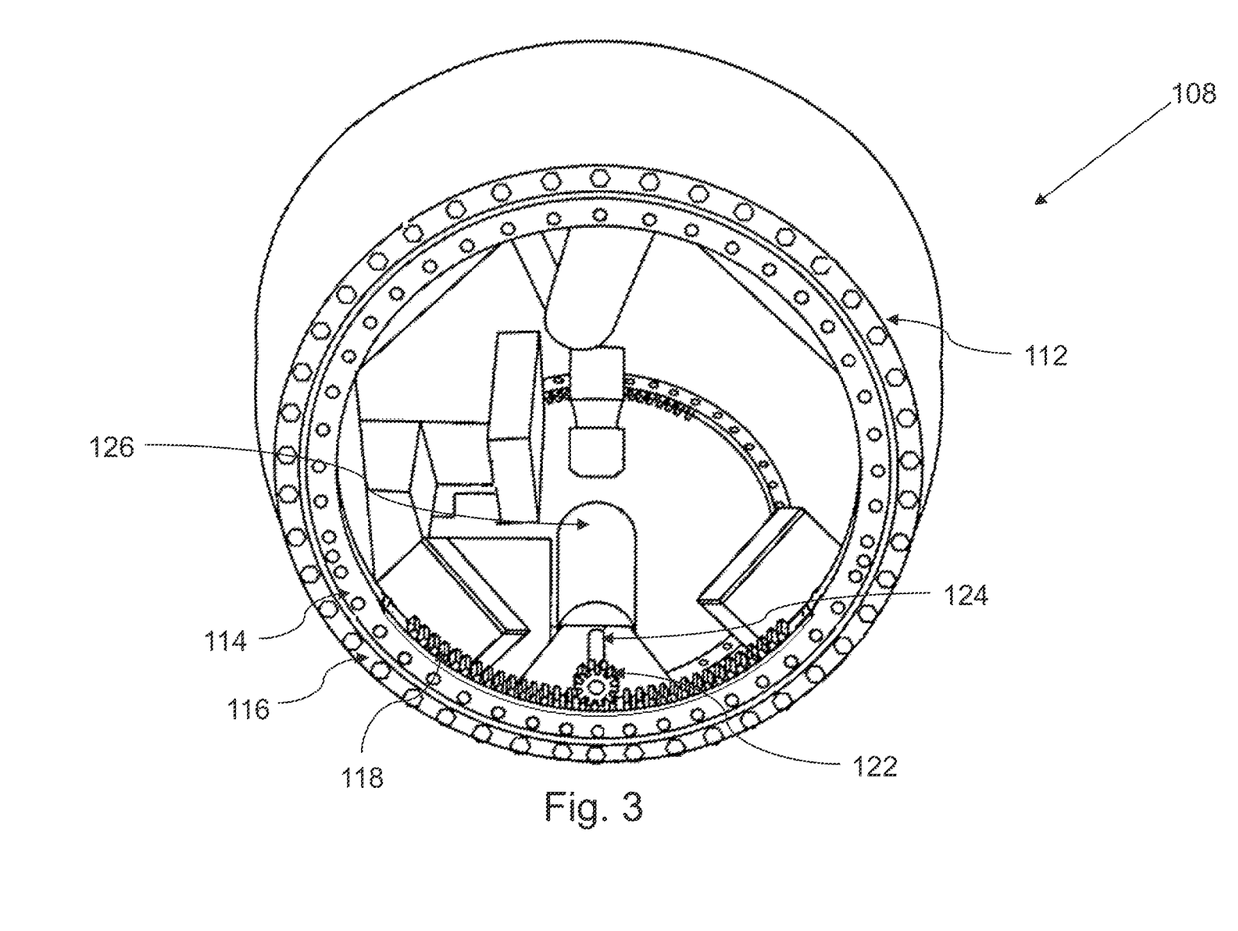
FIG. 3 is an exploded perspective view of the rotor hub and blade portions of the wind turbine with the gear segment according to an embodiment of the invention.
Figure 4:
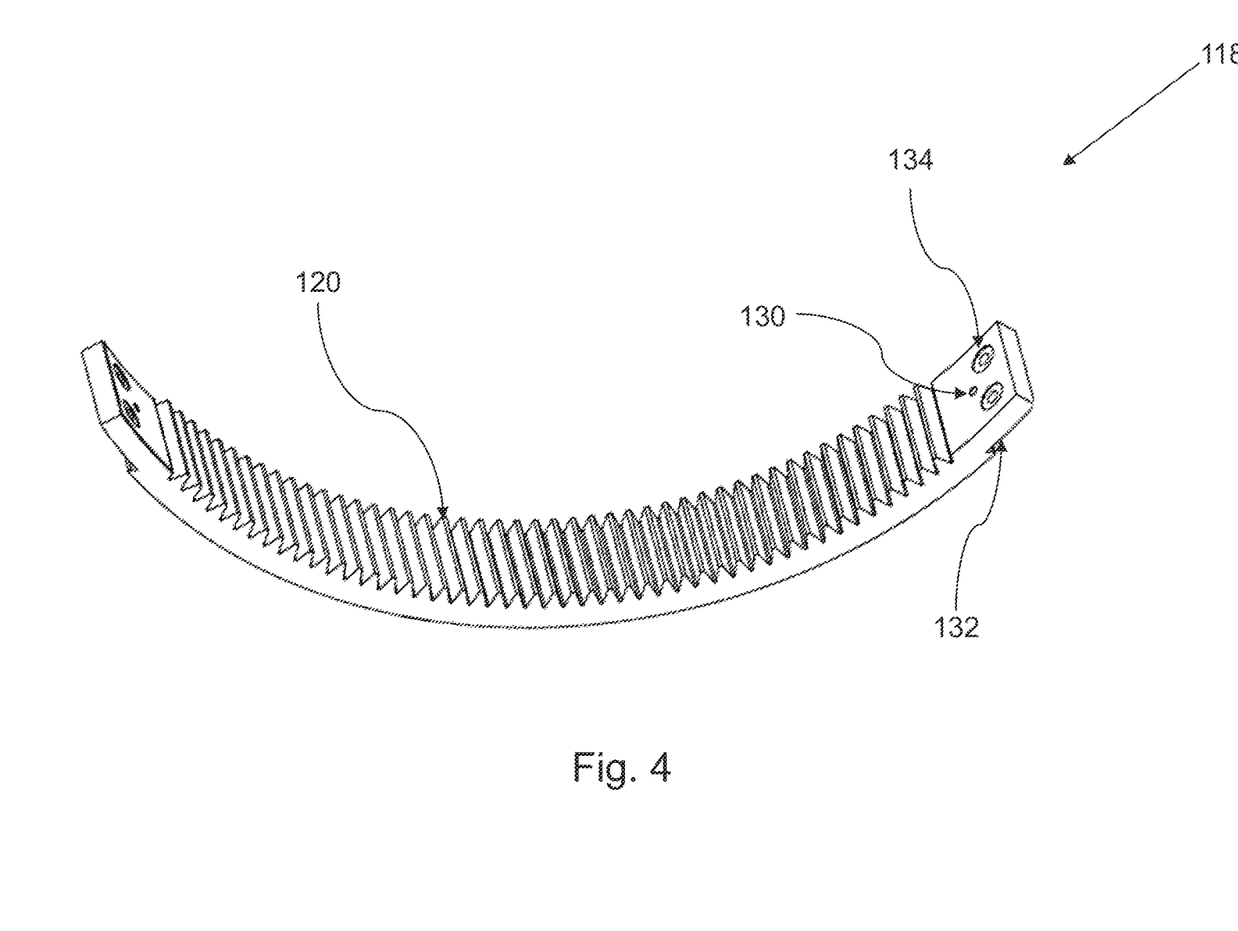
FIG. 4 is a perspective view of a gear segment according to an embodiment of the disclosure.

The pitch bearing 112 further includes a segmented gear plate 118 or a gear segment 118. According to an illustrative embodiment of the disclosure, the gear segment 118 is removably connected to the inner bearing ring 114 as shown in FIG. 3. The gear segment 118 has a concave side and the convex side as shown in FIG. 4. The convex side is attached to the inner bearing ring 114 and the concave side of the gear segment 118 includes a plurality of teeth 120. It should be appreciated that other types of gear teeth configurations, such as worn gears, etc., are well within the scope of this invention.

The plurality of teeth 120 are shaped to mesh with an associated pinion gear 122 present in the rotor hub 108. The pinion gear 122 is present on a motor shaft 124 or a drive shaft or motor axle of a plurality of motors 126. The activation of the plurality of motors 126 results in the rotation of the motor shaft 124. The motor shaft 124 moves the pinion gear 122 connected at other end of the motor shaft 124. The pinion gear 122 moves the gear segment 118 which in turn axially pivots the associated blade 110 between different pitch angles. In an illustrated embodiment, each of the plurality of blades 110 includes their individual motor 126 to change the pitch angle of that particular blade. In the present embodiment, the gear segment 118 provides the arcuate angle between the range of about 100° to about 150°. The range of arcuate angle is not limited to 100° to 150°. It can be varied depending on the requirements in other embodiments of the invention.

Figure 5:
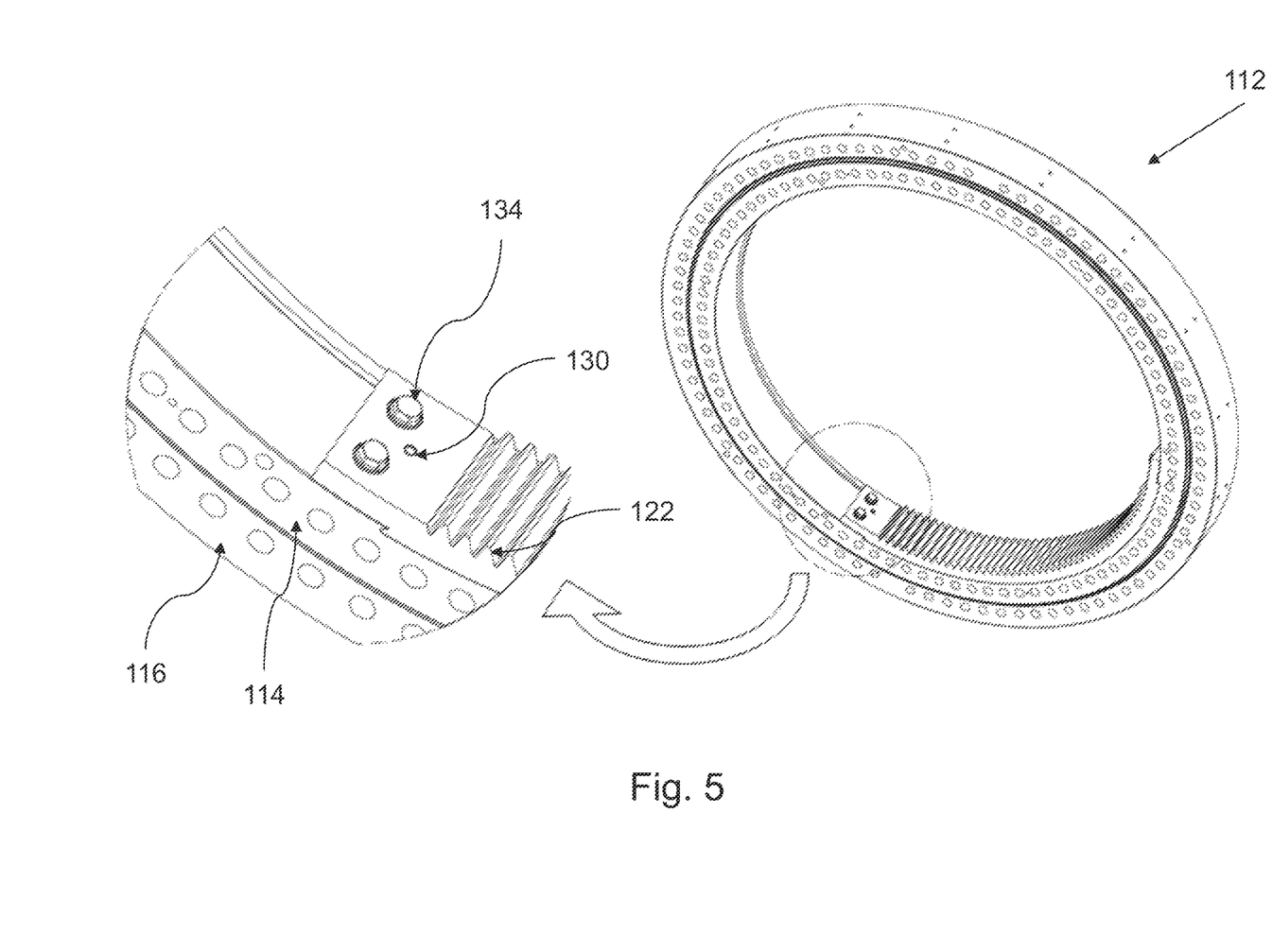
FIG. 5 is one end of the gear segment showing joints of the gear segment with the bearing ring according to an embodiment of the disclosure.
Figure 6:
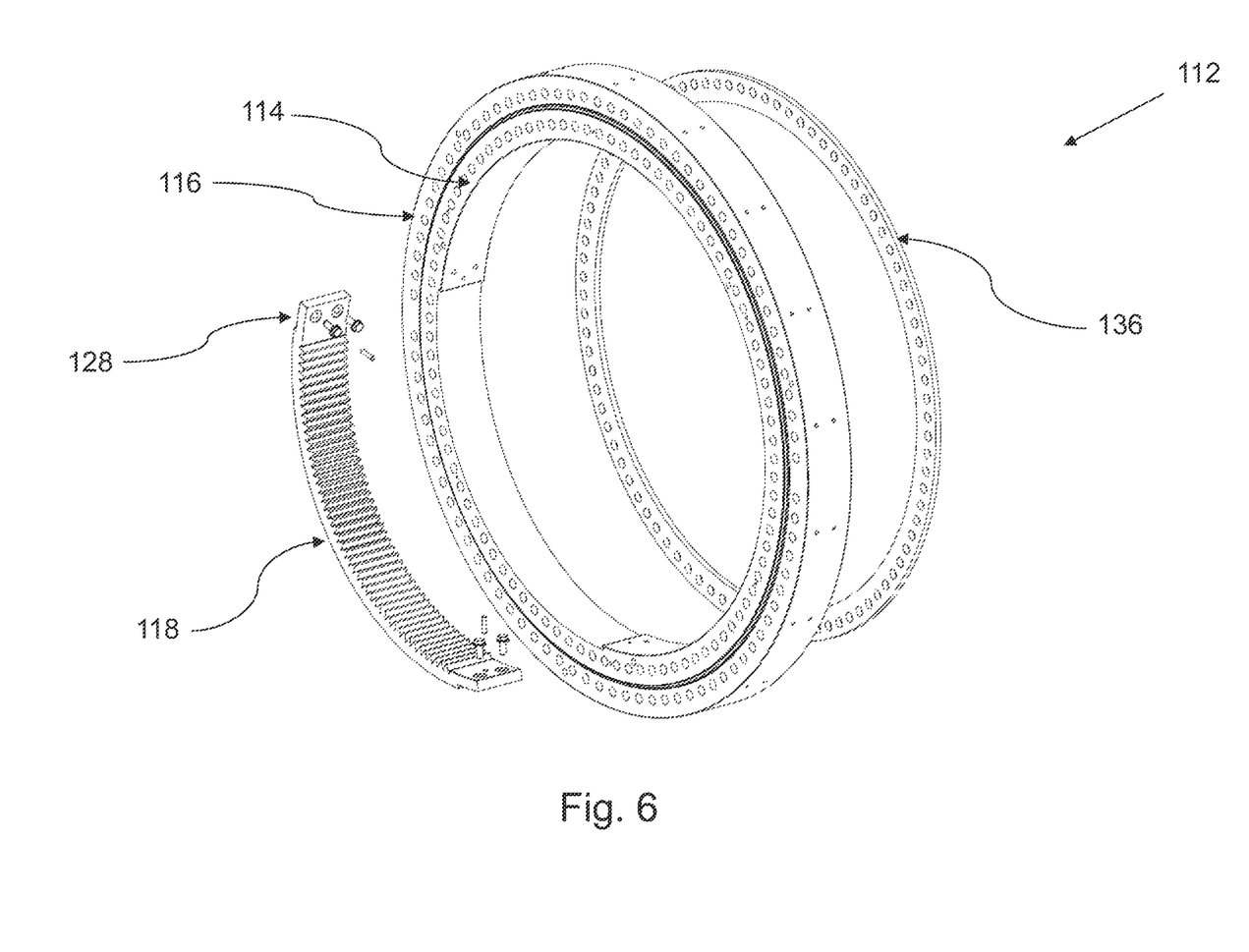
FIG. 6 is an exploded view of the bearing ring along with the gear segment according to embodiment of FIG. 5.

The gear segment 118 is removably connected to the inner bearing ring 114 as shown in FIGS. 5 and 6 through at least one of a plurality of connecting elements 128. The connecting elements 128 ensure a tight connection of the gear segment 118 with the inner bearing ring 114. The connecting elements 128 may include at least one of a dowel joint 130, a dove tail joint 132 and a bolted joint 134. It should be appreciated that any other kind of connecting elements or use of any other kind of connecting method is well within the scope of this invention. The dove tail joint 132 slides in the female grove provided on inner bearing ring 114 or the outer bearing ring 116 of the pitch bearing 112. Few examples may include, but not limited to, a welding joint, a nut-bolt joint etc. In another example, the inner bearing ring 114 and the gear segment 118 may connected by using a spot welding technique. In case of the spot welding, it is easier to remove two joints as compared to other welding techniques.

In the illustrated example as shown in FIG. 4, the connecting elements 128 are present at both the ends of the gear segment 118. It should be appreciated that the connecting elements 128 can be present anywhere along the length of the gear segment 118.

The gear segment 118 further includes a support plate 136 for securing the connection of the gear segment 118 with the inner bearing ring 114 as shown in FIG. 6. The gear segment 118 is manufactured and treated separately using standard industrial processes. The separate manufacture and heat treatment of the gear segment 118 avoids any chance of distortion on the inner bearing ring 114 or the outer bearing ring 116 of the pitch bearing 112. In case the user wants to replace or repair the gear segment 118 then the user doesn't need to dismantle the complete pitch bearing 112. The gear segment 118 can be conveniently removed and reattached to the pitch bearing 112 either from the rotor hub side or the blades side when the rotor hub 108 is on the floor and the plurality of blade 110 are not assembled. The gear segment 118 only can also be removed and/or reassembled from the rotor hub side when the plurality of blades 110 is assembled to the rotor hub 108. The gear segment 118 along with the plurality of teeth 120 may be coated with corrosion resistant materials, such as zinc, chrome, etc., for improved operating life, such as in off shore, salt water installations. Also, the exposed surfaces of gear segment 118 may be painted to inhibit oxidation.

Figure 7:
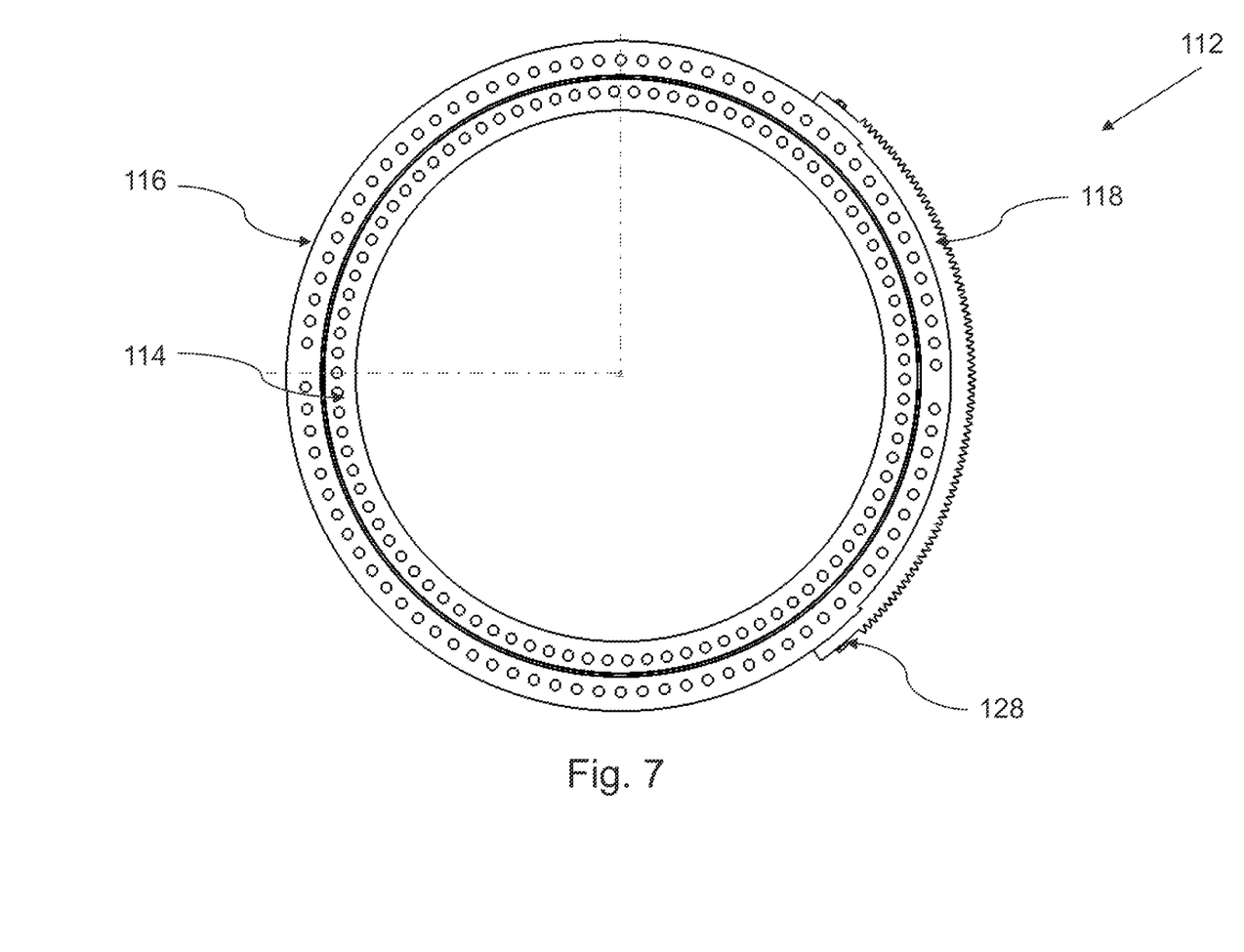
FIG. 7 is a side view of the bearing ring along with the gear segment connected to the outer bearing ring according to another embodiment of the disclosure.
Figure 8:
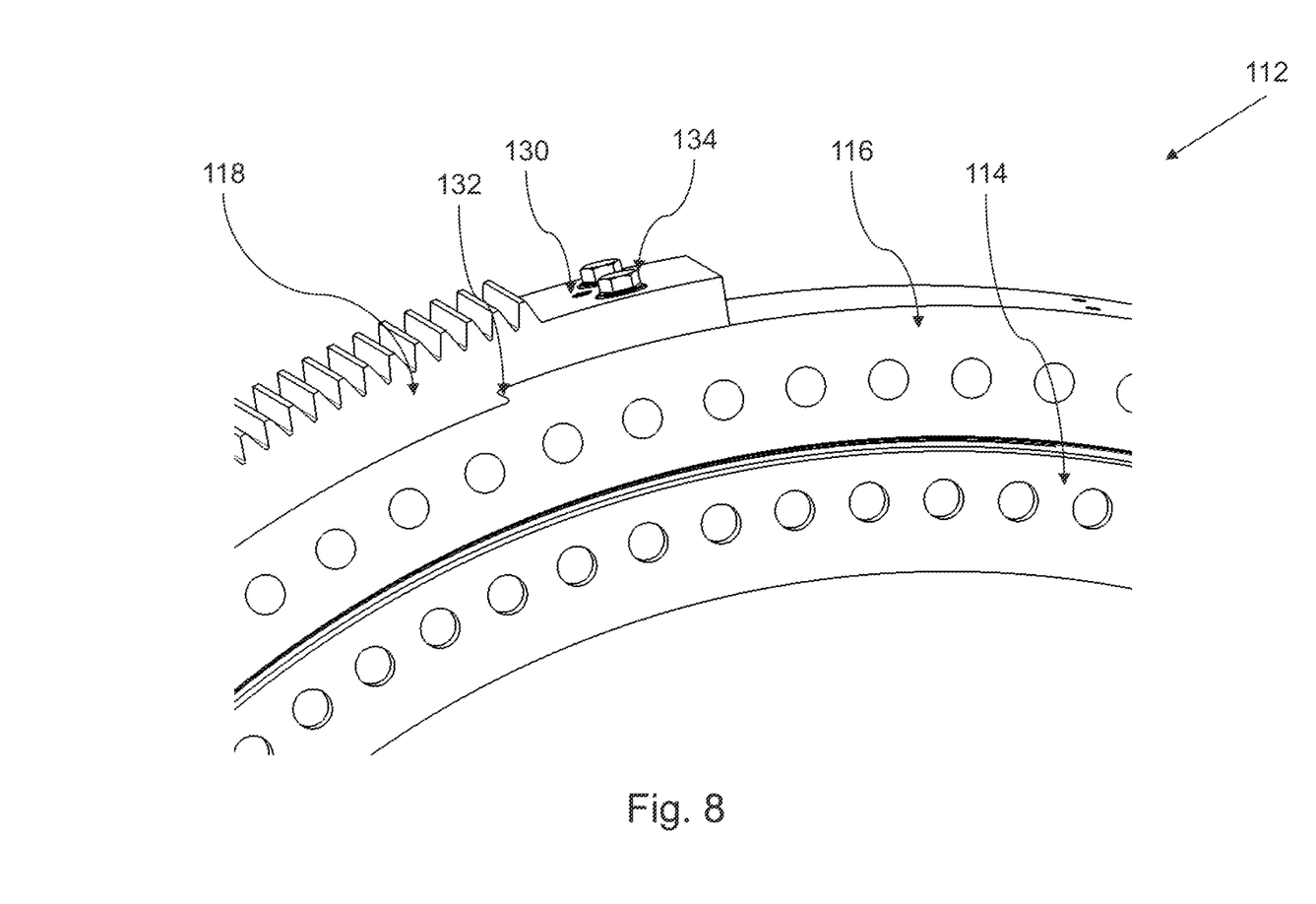
FIG. 8 is a perspective view of one end of the gear segment according to the embodiment described in FIG. 7.

According to another embodiment of the disclosure, the gear segment 118 can also be connected to the outer bearing ring 116 as shown in FIGS. 7 and 8. In this embodiment, the plurality of teeth 120 are present on the convex side of the gear segment 118. The concave side of the gear segment 118 is attached to the outer bearing ring 116. The connecting elements 128 are similar to the elements described in the embodiment of FIG. 5. The connecting element 128 may include at least one of the dowel joint 130, the dove tail joint 132 and the bolted joint 134. It should be appreciated that any other kind of connecting element or use of any other kind of connecting method is well within the scope of this invention. Few examples may include, but not limited to a nut-bolt joint etc. In another example, the outer bearing ring 116 and the gear segment 118 may connected by using a spot welding technique. In case of the spot welding, it is easier to remove two joints as compared to other welding techniques.

When the gear segment 118 is attached to the outer bearing ring 116, then to remove the gear segment 118 entire assembly needs to be removed first. Initially, the blades 110 need to be removed followed by the gear segment 118.

Figure 9:
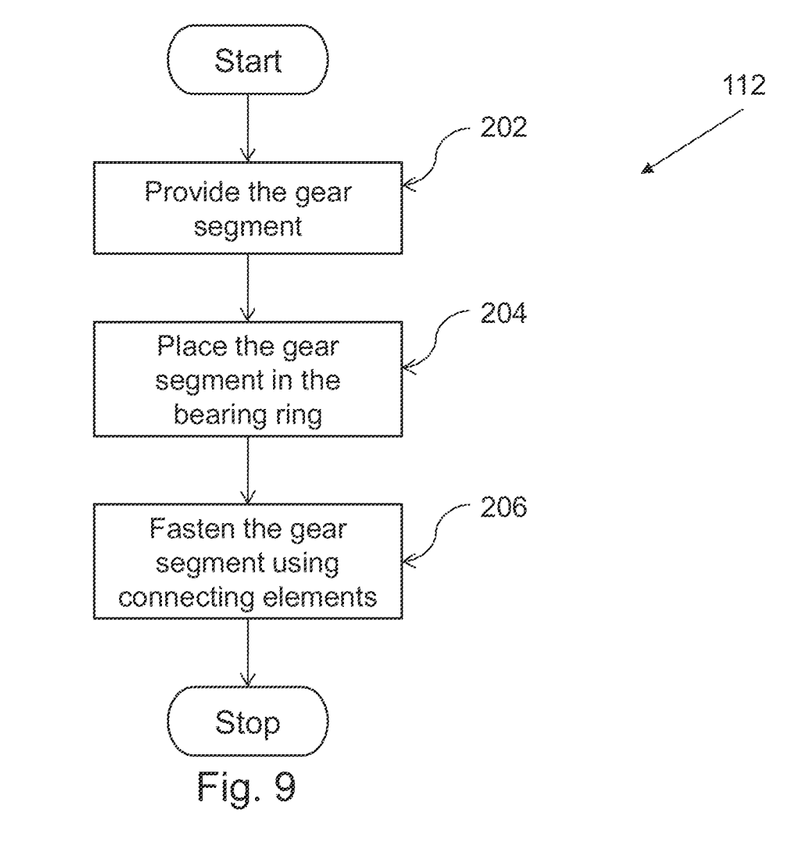
FIG. 9 is a flow chart illustrating the steps of removably attaching a gear segment to a pitch bearing of a wind turbine.

FIG. 9 is a flow chart 200 illustrating the steps of removably attaching the gear segment 118 to the pitch bearing 112 of the wind turbine 100. At step 202, the gear segment 118 is provided for attachment. The gear segment 118 is manufactured and heat treated separately irrespective of the pitch bearing 112. The separate manufacture and heat treatment of the gear segment 118 avoids any chance of distortion on the inner bearing ring 114 or the outer bearing ring 116 of the pitch bearing 112. Thus the separate gear segment 118 is easy to manufacture as compared to the prior art. At step 204, the gear segment 118 is placed in one of the inner bearing ring 114 or outer bearing ring 116 using the dove tail joint 132. And finally, at step 206, the gear segment 118 is fastened to the inner bearing ring 114 or outer bearing ring 116 using the plurality of connecting elements 128.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and various combinations of inventive aspects and principles are possible in light of the various embodiments provided above.

The invention claimed is:

1. A wind turbine having a plurality of blades mounted on a rotor hub, the rotor hub mounted on a nacelle, the wind turbine comprising:
   a pitch bearing for axially pivoting the plurality of blades between different pitch angles, the pitch bearing including an inner bearing ring and an outer bearing ring rotatably interconnected to each other; and
   a gear segment removably connected to the inner bearing ring by connecting elements, the gear segment having a concave side with a plurality of gear teeth, the plurality of gear teeth configured to allow the rotation of a drive shaft to achieve different pitch angles, wherein
   the gear segment comprises a first flange extending from a first circumferential end and a second flange extending from a second circumferential end, and the connecting elements attach the gear segment to the inner bearing ring at the first and second flanges of the gear segment,
   the pitch bearing further including a support plate for securing the connection of the gear segment with the inner bearing ring.

2. The wind turbine of claim 1, wherein the connecting elements are selected from the group consisting of a dove tail joint, a dowel joint, and a bolted joint.

3. The wind turbine of claim 1, wherein the gear segment has an arcuate measure of about 100° to about 150°.

4. The wind turbine of claim 1, wherein each of the plurality of blades further include their individual motor operably connected with the rotor hub, wherein activation of the motors axially pivots the respective blades between the different pitch angles through a motor shaft and a gear segment.

5. A pitch bearing for use in a wind turbine, the pitch bearing comprising:
   an inner bearing ring and an outer bearing ring rotatably interconnected to each other;
   a gear segment removably connected to the inner bearing ring by connecting elements, the gear segment having a concave side with a plurality of gear teeth, the plurality of gear teeth configured to allow rotation of a drive shaft of a motor to achieve different pitch angles, wherein
   the gear segment comprises a first flange extending from a first circumferential end and a second flange extending from a second circumferential end, and the connecting elements attach the gear segment to the inner bearing ring at the first and second flanges of the gear segment,
   said pitch bearing further including a support plate for securing the connection of the gear segment with the inner bearing ring.

6. The pitch bearing according to claim 5, wherein the connecting elements are selected from the group consisting of a dove tail joint, a dowel joint, and a bolted joint.

7. A method of removably attaching a gear segment to a pitch bearing of a wind turbine, the pitch bearing having an inner bearing ring, a support plate connected to the inner bearing ring, and an outer bearing ring, the method comprising:
   providing the gear segment comprising a concave side having a plurality of gear teeth;
   placing the gear segment on the inner bearing ring and on the support plate; and
   connecting a first flange extending from a first circumferential end and a second flange extending from a second circumferential end of the gear segment with the inner bearing ring by connecting elements such that the connection of the gear segment with the inner bearing ring is secured.

8. The method of claim 7, wherein the gear segment is manufactured and treated separately irrespective of the pitch bearing.

9. The method of claim 7, wherein the connecting elements are selected from the group consisting of a dove tail joint, a dowel pin joint, and a bolted joint.

* * * * *